(12) United States Patent
Liang et al.

(10) Patent No.: US 6,373,162 B1
(45) Date of Patent: Apr. 16, 2002

(54) PERMANENT MAGNET ELECTRIC MACHINE WITH FLUX CONTROL

(75) Inventors: Feng Liang, Canton; John Michael Miller, Saline, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/438,744

(22) Filed: Nov. 11, 1999

(51) Int. Cl.[7] ................ H02K 21/12; H02K 21/14; H02K 1/22
(52) U.S. Cl. ............... 310/156.53; 310/181; 310/68 R; 310/112; 310/268
(58) Field of Search ................. 310/156, 216, 310/254, 179, 180, 184, 162, 268, 68 B; 318/701; 29/596–598

(56) References Cited

U.S. PATENT DOCUMENTS

| | | | |
|---|---|---|---|
| 3,531,709 A | 9/1970 | Nazare | |
| 4,207,483 A * | 6/1980 | Baer | 310/49 R |
| 4,496,868 A | 1/1985 | Advolotkin et al. | |
| 4,559,461 A * | 12/1985 | Takahashi et al. | 310/49 R |
| 4,656,379 A | 4/1987 | McCarty | |
| 4,747,288 A | 5/1988 | Fritzsche | |
| 4,845,424 A * | 7/1989 | Gamble | 324/146 |
| 4,890,024 A | 12/1989 | Hashimoto et al. | |
| 4,996,457 A * | 2/1991 | Hawsey et al. | 310/268 |
| 5,530,307 A * | 6/1996 | Horst | 310/156 |
| 5,641,276 A * | 6/1997 | Heidelberg et al. | 417/423.7 |
| 5,684,352 A * | 11/1997 | Mita et al. | 310/156 |
| 5,880,550 A * | 3/1999 | Fukao et al. | 310/179 |
| 5,925,965 A * | 7/1999 | Li et al. | 310/268 |
| 5,982,070 A * | 11/1999 | Caamano | 310/216 |
| 6,037,696 A * | 3/2000 | Sromin et al. | 310/268 |
| 6,133,662 A * | 10/2000 | Matsunobu et al. | 310/156 |

* cited by examiner

Primary Examiner—Tran Nguyen

(57) ABSTRACT

An electric machine or assembly 10 including a generally cylindrical ferromagnetic housing 12, two substantially identical and opposed stator assemblies 14, 16 which are fixedly mounted within housing 12, a generally disc-shaped rotor 18 which is disposed between stator members 14 and 16 and which is coupled to a rotatable shaft 20, and a generally circular and stationary field coil 22, which is fixedly mounted within housing 12 and is controllably and selectively engergizable to vary the output voltage, power, or torque provided by assembly 10.

9 Claims, 3 Drawing Sheets

PERMANENT MAGNET ELECTRIC MACHINE WITH FLUX CONTROL

FIELD OF THE INVENTION

This invention relates to an electric machine, and more particularly, to a hybrid electric machine which generates flux by way of a plurality of permanent magnet poles, a plurality of consequent poles, and a selectively controllable field current, and which provides a relatively constant output power or voltage over a relatively wide range of operating speeds.

BACKGROUND OF THE INVENTION

Electric machines such as generators and motors generally utilize a plurality of rotating magnets and/or rotating magnetic members in order to generate electrical power and/or torque.

One common type of electric machine, known as an electromagnetic motor or generator, generally includes a rotor having a plurality of pole fingers in the form of north and south ferromagnetic members or consequent poles and one or more electric "field coils" which are selectively and electrically energized, thereby selectively producing a flux within the rotating members or "poles" of the rotor. In these types of electromagnetic machines, electric power is supplied to the rotating field coils by way of one or more brushes, slip rings, and/or other devices. The output of these electromagnetic machines (e.g., the output torque, power, and/or voltage) can be relatively easily controlled by varying the amount of current supplied to the "field coils". In this manner, these types of electric machines provide a relatively consistent output voltage, torque, or power over a relatively wide range of operating speeds and temperatures. While these electromagnetic machines are effective to generate a relatively consistent output voltage, torque, or power, they suffer from some drawbacks.

For example and without limitation, the brushes, slip rings, and/or other devices, which are required within these machines to provide an electrical connection to the rotating field coils, undesirably add to the cost, complexity, and size of the machines, and undesirably "wear" or degrade over time, thereby resulting in diminished performance and/or failure of the machine.

A second type of electric machine, known as a permanent magnet motor or generator, generally includes a rotor having a plurality of permanent magnets which form or create poles and selectively produce a flux within the machine. Due to the presence of permanent magnets within the rotor, these types of machines do not typically require field coils to produce magnetic flux. Therefore, these systems do not require the brushes, slip rings or other devices which are necessary in the previously described electromagnetic machines. As such, these permanent magnet machines are typically smaller, less complex, more efficient, and less costly than the previously described electromagnetic machines. These permanent magnet type machines do, however, suffer from some other drawbacks.

For example and without limitation, because the flux generated within these electric machines is provided by permanent magnets, the flux remains substantially constant and is relatively difficult to substantially alter or vary by the use of electric field coils. Thus, the output of these machines (e.g., the output power or voltage) is almost solely and completely dependent upon the operating speed of the machine. As such, these machines are only able provide a relatively consistent or constant output voltage, torque, or power over a relatively narrow and limited range of operating speeds. Therefore, these electric machines cannot be utilized in applications where the operating speed is provided by a relatively "variable" or fluctuating source, such as the engine of a vehicle.

There is therefore a need for a new and improved electric machine which overcomes many, if not all, of the previously delineated drawbacks of such prior electric machines.

SUMMARY OF THE INVENTION

It is a first object of the invention to provide an electric machine which overcomes at least some of the previously delineated drawbacks of prior electric machines.

It is a second object of the invention to provide an electric machine which provides a relatively consistent output power and/or voltage over a relatively wide range of operating speeds.

It is a third object of the invention to provide an electric machine having an output torque, power, and/or voltage which may be substantially and selectively controlled by way of a stationary field coil.

It is a fourth object of the invention to provide an electric machine having a rotor which includes poles generated from both permanent magnets and "soft" magnetic members.

According to a first aspect of the present invention, an electric machine is provided and includes a generally cylindrical ferromagnetic housing; first and second stator assemblies which are fixedly disposed within the housing and which each include a plurality of pole portions and a winding; a rotor which is rotatably disposed between the first and the second stator assemblies, the rotor having a plurality of permanent magnet poles which collectively generate a first magnetic flux and a plurality of consequent poles which cooperatively generate a second magnetic flux; and a coil which is fixedly coupled to the housing and is disposed in relative close proximity to the rotor. The coil is selectively energizable, and effective to controllably vary the second magnetic flux.

According to a second aspect of the invention a method for providing an electric machine having a controllable output voltage is provided. The method includes the steps of providing a ferromagnetic housing; providing a rotor having a plurality of permanent magnet poles which selectively generate a first magnetic flux and a plurality of consequent poles which selectively generate a second magnetic flux; disposing the rotor within the housing; providing a stator having winding; disposing the stator within the housing and in relative close proximity to the rotor; providing a field coil; fixedly disposing the field coil in relative close proximity to the rotor; selectively energizing the winding effective to produce torque between the rotor and the stator, the torque having a magnitude; and selectively energizing the field coil, effective to vary the second magnetic flux, thereby controlling the magnitude of the torque.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
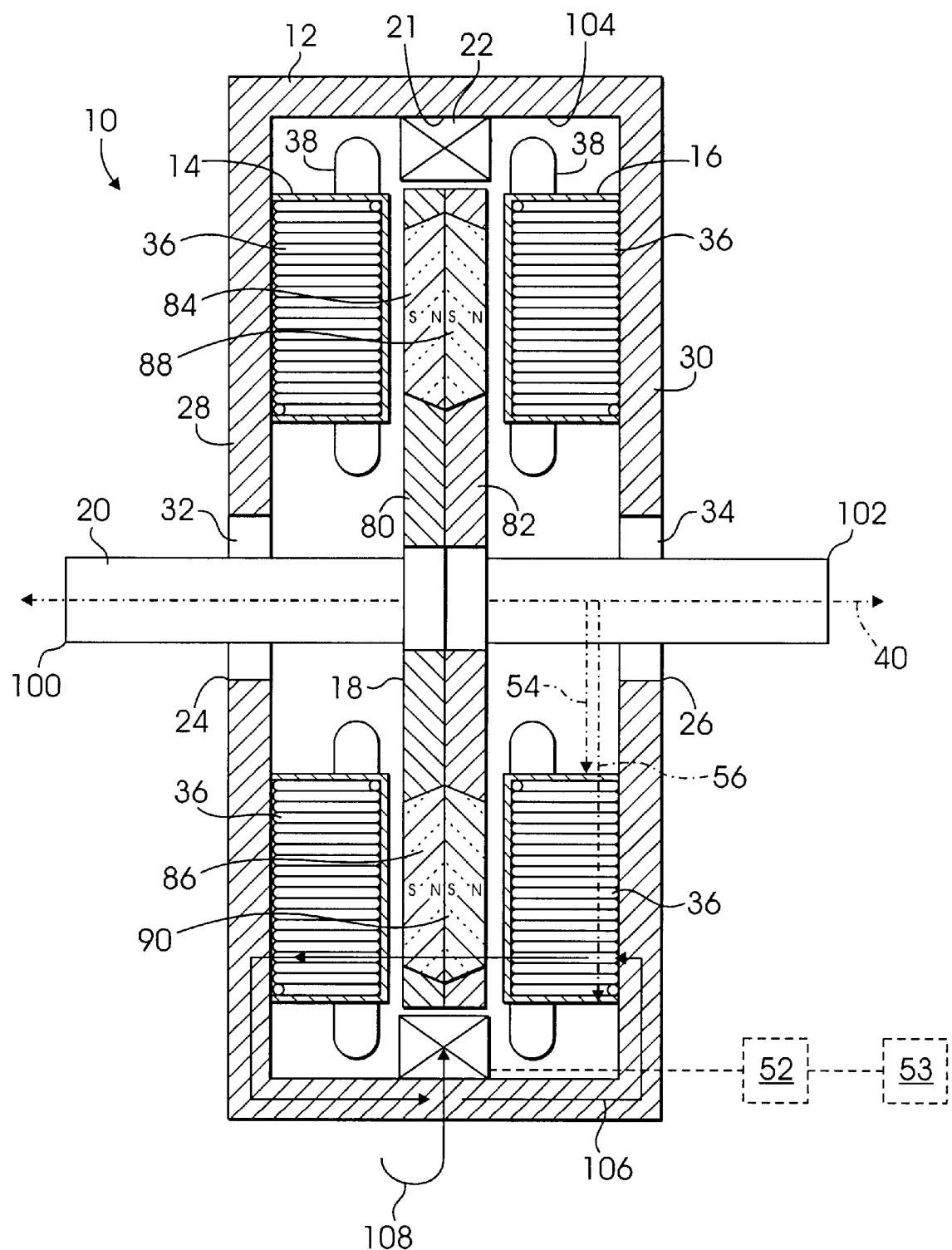
FIG. 1 is a sectional view of an electrical machine assembly which is made in accordance with the teachings of the preferred embodiment of the invention.

Referring now to FIGS. 1–4, there is shown an electric machine or assembly 10 made in accordance with the teachings of the preferred embodiment of the invention. As best shown in FIG. 1, assembly 10 includes a generally cylindrical housing or member 12, two substantially identical and opposed stator assemblies or members 14, 16 which are fixedly coupled to and/or are mounted within member 12, a generally disc-shaped rotor 18 which is disposed between and in relative close proximity to stator members 14 and 16 and which is coupled to a rotatable shaft 20, and a generally circular and stationary field coil 22, which is fixedly mounted within member 12.

In the preferred embodiment of the invention, member 12 is formed and/or manufactured from a "soft" magnetic or ferromagnetic material such as iron. Member 12 includes a pair of substantially identical apertures 24, 26 which are respectively and integrally formed within sides 28, 30 of member 12. A pair of conventional bushing or bearing members 32, 34 are respectively and operatively housed within apertures 24, 26, and rotatably engage shaft 20, thereby allowing shaft 20 to rotate about the longitudinal axis 40 of shaft 20 while concomitantly and substantially maintaining the position of axis 40 within apertures 24, 26.

Stator members 14, 16 are substantially identical in structure and function and are each respectively "ring" shaped. Members 14, 16 each include a centrally disposed aperture 44, a core portion 36, and a conventional stator coil or winding 38, which may comprise a conventional polyphase winding. In one non-limiting embodiment, winding 38 comprises three mutually independent windings which give rise to a conventional "three-phase" alternating current.

Figure 2:
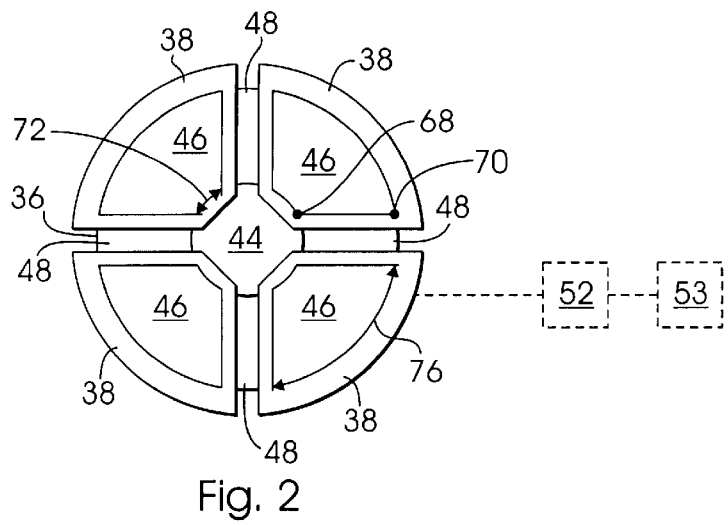
FIG. 2 is side view of one of the stators employed within the electrical machine assembly shown in FIG. 1.
Figure 3:
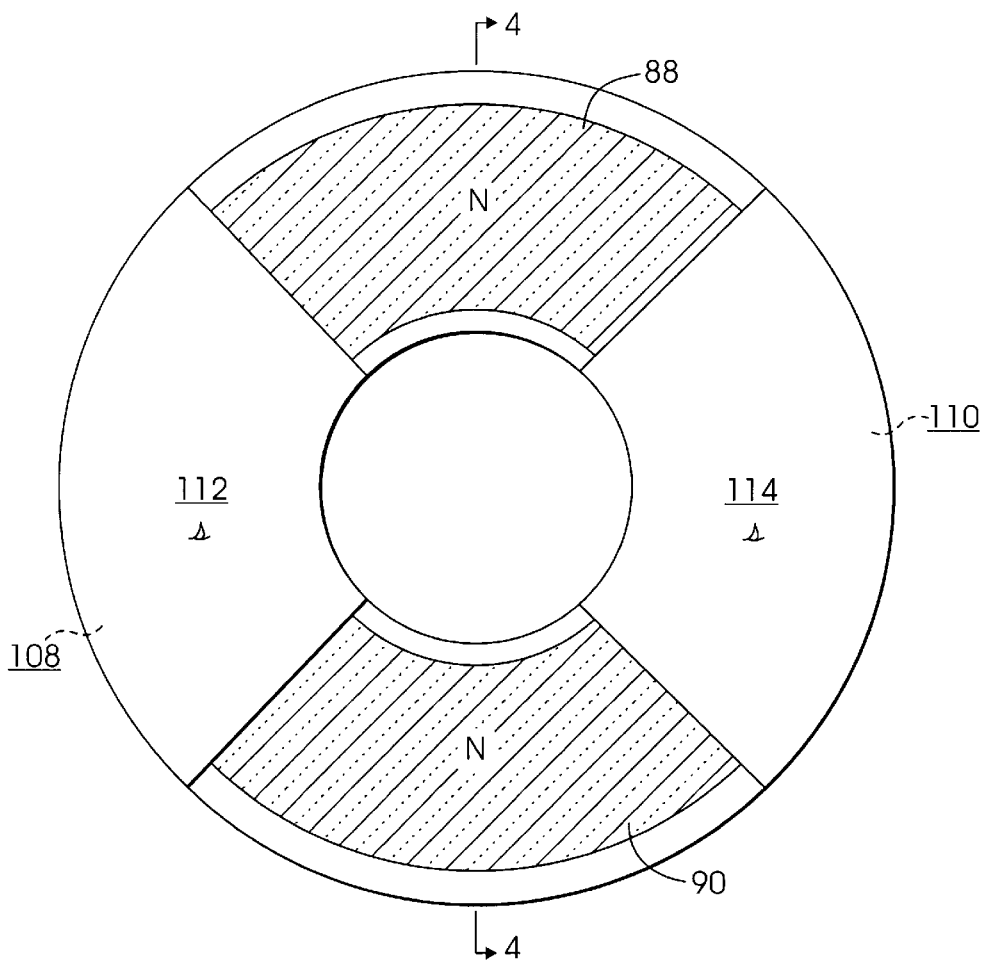
FIG. 3 is a side view of the rotor employed within the electrical machine assembly shown in FIG. 1.

In one non-limiting embodiment, illustrated in FIG. 2, cores 36 each respectively have four substantially identical raised or "pole" portions 46, which are separated by four substantially identical "channels" or recessed portions 48. It should be appreciated that the number of pole portions 48 and channels 46 illustrated in FIG. 2 does not limit the scope of the present invention, and that in other alternate embodiments, stator members 14, 16 include a different number or quantity of raised portions 46 and a corresponding different number or quantity of channels or recessed portions 48. For example and without limitation, in embodiments employing a conventional "three-phase", the number or quantity of raised portions 46 and recessed portions 48 are each equal to a multiple of three (3).

Winding 38 is wound around pole portions 48 in a conventional manner and is electrically, physically, and communicatively coupled to a switching and/or controller assembly 52 which may include a microprocessor/controller and a plurality of electrical and/or electromechanical switching and frequency converting components or devices, such as and without limitation transistors, diodes, relays, transformers, and other electrical components. Controller assembly 52 is electrically coupled to a conventional power supply or battery 53.

Figure 5:
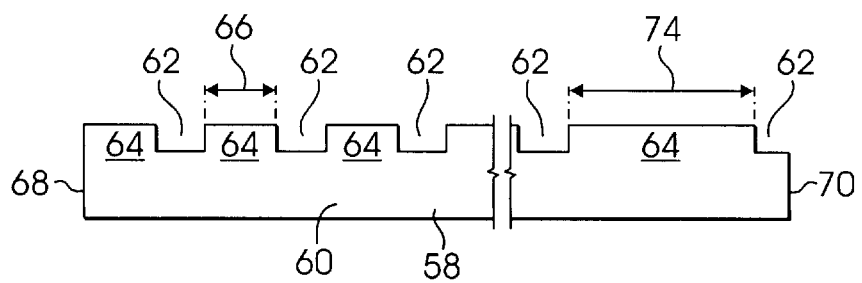
FIG. 5 is a partial side view of a portion or amount of metallic "tape" which is used to make a stator assembly which is used and/or contained within the electric machine shown in FIG. 1.

Referring now to FIG. 5, in the preferred embodiment of the invention, stator cores 36 are each respectively manufactured from an amount or quantity of magnetic tape or "band" material 58, such as steel tape which is spirally wound or "coiled" from an initial or interior radius 54 to an exterior radius 56, as illustrated in FIG. 1. Member 58 is preferably made of a soft magnetic material and is coated with a relatively thin layer of insulating material 60, which in one nonlimiting embodiment comprises an oxide or an organic film. Member 58 includes a plurality of substantially identical recessed portions or "notches" 62, which collectively and cooperatively create and/or form channels 48 when core 36 is wound. In the preferred embodiment of the invention, notches 62 are cut, punched, or otherwise machined into member 58 in a conventional manner. Each notch 62 is separated by a raised portion 64 having a length which varies over the length of member 58 from the "beginning" or "inner" end 68 of member 58 to the "terminating" or "outer" end 70 of member 58. Portions 64 collectively and cooperatively create and/or form raised portions 46 when core 36 is wound. The length 66 of each raised portion 64 (e.g., the distance between notches 62) is increased by a predetermined distance or amount for each portion 64 beginning at point or end 68 of core 36/member 58 and continuing through to the point or end 70 of core 36/member 58. Particularly, this length 66 is increased to compensate for the radius of the core 36 which increases during the formation of core 36, as the core 36 is spirally "wrapped" or coiled, thereby producing larger circumferences and circumferential segments. For example and without limitation, during the first "wrap" or coil of member 58, the length of raised portion 64 (i.e., length 66 which is illustrated in FIG. 5) is approximately equal to the length of curved or circumferential segment 72, which is illustrated in FIG. 2, and during the last wrap or "coil" of member 58, the length of raised portion 64 (i.e., length 74 which is illustrated in FIG. 5) is approximately equal to the length of curved or circumferential segment 76, which is illustrated in FIG. 2. Thus, by increasing the length between notches 62 over the entire length of member 58, member 58 will substantially conform to the desired structure of core 36 which is illustrated in FIG. 2 when it is spirally wound or "wrapped".

In one non-limiting embodiment, member 58 is "fed" through and/or placed within a conventional stamping or tooling machine, which operates under stored program control, and which stamps or cuts notches 62 into member 58. In such an embodiment, each notch 62 is cut or stamped after a certain length of member 58 is fed through the machine, the distance or length between each notch 62 is increased as previously described. The distance between each notch 62 is calculated by the machine or by the stored program using the values of the inner radius 54 of the core 36, the outer radius 56 of core 36, and the "thickness" of member 58.

It should be appreciated that the pre-stamping or cutting of notches 62, and the individually laminated "coils" or wraps of member 58 cooperatively and substantially reduce the amount of "iron losses" within cores 36. Particularly, if the channels 48 were cut into core 36 after the core was wound, the cutting process would undesirably "short" the individual layers or windings of member 58 together, thereby undesirably producing current losses within the core 36. Thus, by cutting notches 62 prior to "winding" core 36, these losses are reduced and/or substantially eliminated.

Figure 4:
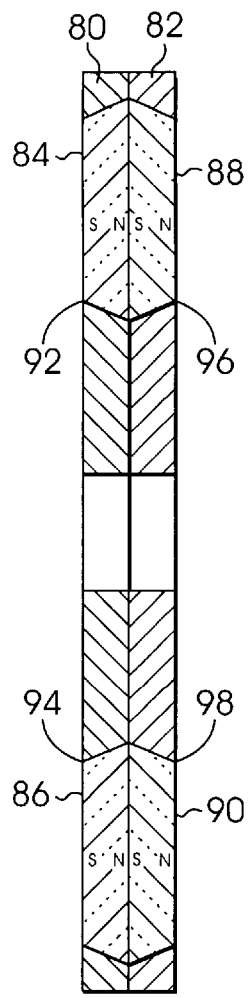
FIG. 4 is a sectional view of the rotor shown in FIG. 3 and taken along view line 4—4.

Rotor 18 is manufactured from a ferromagnetic or "soft" magnetic material, such as iron or steel, and includes two disk shaped pole pieces or "halves" 80, 82 which are joined together in a conventional manner and which are collectively and conventionally coupled to rotor shaft 20. Each pole piece 80, 82 respectively includes a plurality of peripherally disposed permanent magnets or magnet members 84, 86, and 88, 90, which are made from a permanent magnet material. While the nonlimiting embodiment illustrated in FIGS. 3 and 4 employs four magnets (i.e., magnets 84–90), other alternate embodiments employ different numbers or quantities of magnets. In the preferred embodiment, magnets 84–90 are semi-circular or "wedge-shaped" and have a trapezoidal-shaped cross section, as best shown in FIGS. 1 and 4. The magnets 84–90 are inserted into slots 92–98 which are respectively and integrally formed within pole pieces 80 and 82, and which also have "trapezoidal" cross sections which cooperate with the trapezoidal shape of magnets 84–90 to abuttingly engage and secure magnets 84–90 within pole pieces 80, 82, thereby substantially preventing magnets 84–90 from moving or becoming dislodged during operation of assembly 10. Magnets 84, 86 are respectively and abuttingly engaged with magnets 88, 90 as shown in FIGS. 1 and 4, with the south poles of magnets 88, 90 respectively abutting the north poles of magnets 84, 86.

Each pole piece 80, 82 further respectively includes a plurality of peripherally disposed soft magnetic or ferromagnetic magnetic portions or "consequent poles" 108, 110 and 112, 114, which are respectively disposed "between" magnet members 84, 86, and 88, 90, or in an "alternating" relationship with members 84, 86 and 88, 90. Portions 108–114 are made from a soft magnetic or ferromagnetic material such as iron, and are capable of being temporarily magnetized in the presence of a field current.

Alternate embodiments or rotor 18 having different or additional numbers of permanent magnets will have a corresponding different or additional number of consequent poles disposed in an alternating relationship with the permanent magnets (e.g., "between" the permanent magnets). In such alternate embodiments, the number of permanent magnets and consequent poles and the "pole pitch" of the permanent magnets and consequent poles will respectively correspond with and/or substantially equal the number of raised or pole portions 48 within stator core 36 and the "pitch" of pole portions 48. In embodiments utilizing a polyphase winding, the number or quantity of raised portions 48 within stator core 36 will preferably be equal to a multiple of the total number or quantity of permanent magnets and consequent poles used (e.g., a multiple of three for a three-phase winding), and the pitch of pole portions 48 will preferably be equal to a fraction of the pitch of the magnets and consequent poles used (e.g., one third for a three-phase winding).

Shaft 20 is generally cylindrical and includes a pair of ends 100, 102 which allow rotor 18 to be operatively coupled to a pulley, drive belt, or other device (not shown), which provides torque to rotor 18 and/or which receives torque from rotor 18.

Field coil 22 is generally circular in shape and is mounted on a bobbin 21 which is fixedly and circumferentially coupled to the interior surface 104 of member 12. Coil 22 is disposed between stators 14, 16, in relative close proximity to rotor 18, and substantially encircles rotor 18. Coil 22 is electrically, physically, and communicatively coupled to switching and/or controller assembly 52 which selectively and operatively sources or provides electrical power to coil 22, from power supply 53 in a conventional manner.

In operation, assembly 10 is coupled by way of one or both of ends 100, 102 to a device (not shown) which provides and/or receives torque to/from shaft 20. For example and without limitation, assembly 10 can be used as a motor to provide torque and power to other devices or apparatuses through shaft 20. Particularly, when torque is desired within shaft 20, controller 52 selectively sources or provides power from supply or battery 53 to field coil 22 and/or windings 38, thereby energizing windings 38 and/or coil 22 effective to create a varying magnetic field or flux such as field 106, illustrated in FIG. 1. As should be appreciated by one of ordinary skill in the art, the presence of the varying magnetic field or flux causes torque to develop between the rotor 18 and stators 14, 16, thereby causing rotor 18 to rotate about axis 40, and providing a rotational force or torque which is selectively transferable to other apparatuses or devices by way of shaft 20.

The strength and/or magnitude of this generated torque and power varies based primarily upon the rotational speed of rotor 18. In order maintain the torque and/or power at a substantially constant and/or desired magnitude, field coil 22 is selectively activated by way of controller 52. Particularly, if the rotational speed of rotor 18 is less than or greater than the speed required to achieve a desired torque or power, controller 52 selectively activates and/or energizes field coil 22. For example and without limitation, in order to increase the generated output torque or power, controller 52 sources power from battery 53 to field coil 22, thereby generating a field current within coil 22 in the direction of arrow 108. The generated field current causes the "soft" magnetic portions or sections 108–114 to act as poles which strengthen the overall flux magnitude of field 106. By varying the strength and/or magnitude of the field current within coil 22, controller 52 selectively causes sections 108–114 to selectively provide the necessary additional flux needed to maintain a substantially consistent output torque or power.

When the rotor 18 is rotating at a speed which generates a higher than desired output torque or power, controller 52 selectively and controllably sources electrical power through coil 22 in the direction opposite arrow 108 (e.g., provides an inverted voltage), thereby causing sections 108–114 to act as poles which diminish or "weaken" the strength and/or magnitude of field 106 (e.g., causing sections 108–114 to generate a magnetic field/flux in the opposite direction as field 106), thereby reducing the overall torque and/or power provided by assembly 10.

Assembly 10 may also be used as a "generator" or an "alternator" by coupling shaft 20 to a torque providing apparatus, such as a vehicle engine (not shown), by way of one or more pulleys, gears and/or other devices. As torque is provided to shaft 20, rotor 18 begins to rotate about axis 40. As rotor 18 and permanent magnets 84–90 rotate about axis 40, a varying magnetic field or flux, such as field 106, is generated which passes through windings 38, thereby inducing a voltage and/or current within windings 38.

In order to maintain the induced voltage/current at a substantially constant magnitude, field coil 22 is selectively activated by way of controller 52. Particularly, if the rotational speed of rotor 18 is less than or greater than the speed required to achieve a desired voltage, controller 52 selectively activates and/or energizes field coil 22, as previously described. By varying the direction and/or magnitude of the field current within coil 22, controller 52 selectively causes sections 108–114 to selectively provide the necessary field "weakening" or "strengthening" flux needed or required to maintain a substantially consistent output voltage/current.

In this manner, assembly 10 selectively and controllably provides and maintains a substantially consistent output torque, power, and/or voltage over a relatively wide range of operational or rotational speeds. Assembly 10 provides this consistent output torque, power, and/or voltage over a relatively wide range of speeds without the use of brushes or slip rings, and with all of the other advantages associated with permanent magnet machines, such as a compact design and a relatively high efficiency.

In one non-limiting embodiment, shaft 20 is coupled to the crankshaft of a vehicle engine and is used as both a motor (e.g., a "starter") and an alternator, or a "starter-alternator". By sourcing power from the vehicle battery to coil 22, assembly 10 may controllably and selectively cause the vehicle's engine to crank, thereby obviating the need for a separate vehicle starter. Particularly, when the vehicle is not running (e.g., the engine is not in operation), controller 52 can be used to selectively source power from battery 53 to coil 22 and/or windings 38, thereby providing a rotational torque through shaft 20 for turning/cranking the vehicle's engine. When the vehicle is running, the coupling of the crankshaft of the vehicle's engine to shaft 20 provides the input torque and operating speed required to generate electrical power within assembly 10 as described above.

It is understood that the invention is not limited by the exact construction or method illustrated and described above but that various changes and/or modifications may be made without departing from the spirit and/or the scope of the inventions.

What is claimed is:

1. An electric machine comprising:
   a housing;
   a pair of stators which are fixedly disposed within said housing and which each include a core and a winding;
   a first rotor which is rotatably mounted to a shaft and which is disposed between said pair of stators, said rotor having a first plurality of permanent magnets, a first plurality of consequent poles, a second plurality of permanent magnets which cooperate with said first plurality of permanent magnets to selectively generate a first magnetic flux, and a second plurality of consequent poles which cooperate with said first plurality of consequent poles to selectively generate a second magnetic flux; and
   a field coil, said field coil being fixedly and circumferentially mounted within said housing; and
   a controller which is operatively coupled to said field coil and which selectively provides power to said field coil, thereby causing said field coil to selectively vary said second magnetic flux.

2. The electric machine of claim 1 wherein said controller is further operatively coupled to said winding, and selectively provides electrical power to said winding effective to vary said first and said second magnetic flux, thereby causing said rotor to rotate and to provide torque to said shaft.

3. The electric machine of claim 1 wherein said shaft is coupled to a selectively rotatable member, said rotation of said member is effective to cause said rotor to rotate, thereby varying said first and said second magnetic flux and generating electrical current within said windings.

4. The electric machine of claim 1 wherein said rotor includes a plurality of slots which cooperatively retain said first and said second plurality of permanent magnets.

5. The electric machine of claim 4 wherein said plurality of slots and said first and said second plurality of permanent magnets each have trapezoidal cross sections which cooperate to retain said first and said second plurality of magnets within said slots.

6. A method for providing an electric machine having a controllable output voltage, said method comprising the steps of:
   providing a ferromagnetic housing;
   providing a rotor having a plurality of permanent magnet poles which selectively generate a first magnetic flux and a plurality of consequent poles which selectively generate a second magnetic flux;
   disposing said rotor within said housing;
   providing a stator having winding;
   disposing said stator within said housing and in relative close proximity to said rotor;
   providing a field coil;
   fixedly disposing said field coil in relative close proximity to said rotor;
   selectively energizing said winding effective to produce torque between said rotor and said stator, said torque having a magnitude; and
   selectively energizing said field coil, effective to vary said second magnetic flux, thereby controlling said magnitude of said torque.

7. The method of claim 6 further comprising the steps of:
   providing a controller;
   coupling said controller to said field coil, effective to controllably and selectively energize said field coil; and
   selectively energizing said second winding effective to increase said magnitude of said torque.

8. The method of claim 6 further comprising the steps of:
   providing a second stator having a second winding; and
   disposing said second stator in relative close proximity to said rotor.

9. The method of claim 6 further comprising the steps of:
   providing a shaft;
   coupling said rotor to said shaft; and
   coupling said shaft to a selectively rotatable device, thereby selectively causing said shaft to rotate.

* * * * *